United States Patent Office.

WILLIAM WEAVER, OF PHŒNIXVILLE, PENNSYLVANIA.

Letters Patent No. 63,589, dated April 2, 1867.

IMPROVED COMPOSITION FOR DESTROYING INSECTS.

*The Schedule referred to in these Letters Patent and making part of the same.*

TO ALL WHOM IT MAY CONCERN:

Be it known that I, WILLIAM WEAVER, of Phœnixville, Chester county, Pennsylvania, have invented a Composition for Destroying Peach and Apple-Tree Borers; and I do hereby declare the following to be a full, clear, and exact description of the same.

My invention consists of a composition, described hereafter, to be applied to peach and apple trees for destroying the borers which pierce and kill such trees; also of a composition which prevents the parent insect from depositing its eggs on the trees.

In order to enable others to carry out my invention, I will now proceed to describe the mode of compounding and applying the same.

The apple-tree borer, *Saperda bivitata*, and the peach borer, *Ageria exitiosa*, although insects differing from each other in many particulars, are, as regards their destructive habits, so similar that the following remarks will apply to both:

The parent insect deposits its eggs, in the summer, on or in punctures in the bark of the tree, at or near the ground. In a few days the eggs are hatched, and the larvæ, or young borers, proceed at once to penetrate, first the bark, and finally the woody fibres of the tree, discharging through the orifice small cuttings or borings. This is continued until the grub arrives at its full growth, when it leaves the cavity, assumes the pupa form, and finally that of a beetle or fly. The ravages of these insects are such that the majority of fruit-bearing trees of an orchard have been occasionally destroyed by them in a few years. The only remedy appears to be the destruction of the grub before it can seriously damage the tree, and this has generally been effected by the introduction of a wire into the orifice which contains the grub, thereby crushing the same, an operation which demands tedious manipulation and careful search. I have found, after repeated trials, that salt and soda ash mixed together afford an effective remedy for this pest of the orchard, the composition being applied to the tree near the ground. The rain or dew dissolves the composition, which is absorbed by the cuttings of the insect, and thus reaching the latter, effects its destruction. It is important, however, that not only the larvæ should be destroyed, but that the parent insect should be prevented from lodging its eggs on or in the bark of the trees. This end I accomplish by mixing with the above ingredients slaked lime and sulphur, which are so offensive to the insects that they will not approach a tree about the base of which these ingredients have been scattered; hence I prefer to use a composition of the following ingredients in about the proportions designated: Air-slaked lime, seventy per cent.; common salt, fifteen per cent.; soda ash, ten per cent.; sulphur, (flowers of,) five per cent. These ingredients are thoroughly mixed, and the composition is applied to the tree at and a short distance above the ground, in quantities varying from about one pint to three quarts, in proportion to the size of the tree. I have found that a single application of this composition will suffice, not only to kill the larvæ, but to prevent the parent insect from depositing its eggs on the tree.

I claim as my invention, and desire to secure by Letters Patent—

1. A composition of salt and soda ash to be applied to fruit trees, as and for the purpose set forth.
2. The above composition, in combination with slaked lime and sulphur, for the purpose specified.

In testimony whereof I have signed my name to this specification in the presence of two subscribing witnesses.

WM. WEAVER.

Witnesses:
P. G. CAREY,
J. T. McCORD.